(12) United States Patent
Maehara et al.

(10) Patent No.: US 8,489,211 B2
(45) Date of Patent: Jul. 16, 2013

(54) COMMUNICATION APPARATUS

(75) Inventors: Kazuo Maehara, Kanagawa-ken (JP);
Tomohiro Kosaka, Kanagawa-ken (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 461 days.

(21) Appl. No.: 11/254,884

(22) Filed: Oct. 21, 2005

(65) Prior Publication Data
US 2006/0121886 A1  Jun. 8, 2006

(30) Foreign Application Priority Data

Nov. 12, 2004 (JP) ................................. 2004-328457

(51) Int. Cl.
*G06F 17/00* (2006.01)
*H04M 1/725* (2006.01)
*H04M 1/64* (2006.01)

(52) U.S. Cl.
USPC ................ 700/94; 455/412.2; 379/88.12

(58) Field of Classification Search
USPC ............. 379/1.02, 1.03, 32.01, 88.11, 88.12, 379/88.22, 88.24; 455/425, 566, 568, 401, 455/412.1, 412.2; 700/94
See application file for complete search history.

(56) References Cited

U.S. PATENT DOCUMENTS

| | | | |
|---|---|---|---|
| 6,459,906 B1 * | 10/2002 | Yang | 455/566 |
| 6,574,471 B1 * | 6/2003 | Rydbeck | 455/566 |
| 7,272,232 B1 * | 9/2007 | Donaldson et al. | 455/556.1 |
| 2002/0006785 A1 * | 1/2002 | Ohtsuki | 455/414 |
| 2002/0177471 A1 * | 11/2002 | Kaaresoja et al. | 455/567 |
| 2003/0097659 A1 * | 5/2003 | Goldman | 725/89 |
| 2003/0215098 A1 * | 11/2003 | Marumoto | 381/71.1 |
| 2004/0171377 A1 | 9/2004 | Engstrom | |
| 2004/0203651 A1 * | 10/2004 | Qu et al. | 455/556.1 |

FOREIGN PATENT DOCUMENTS

| | | |
|---|---|---|
| EP | 1244274 A1 | 9/2002 |
| JP | 2001-308977 | 11/2001 |
| JP | 2001-313701 | 11/2001 |
| JP | 2002-077458 | 3/2002 |
| JP | 2002-223279 | 8/2002 |
| JP | 2002-223280 | 8/2002 |
| JP | 2002-314633 | 10/2002 |
| JP | 2003-162355 | 6/2003 |

(Continued)

OTHER PUBLICATIONS

Techtoyer, "Siemens SL45 MP3/WAP Mobile Phone", Siemens SL45 MP3/WAP Mobile Phone, Feb. 19, 2001, retrieved from http://www.hardwarezone.com/articles/view.php?cid=24&id=196 &pg=4>.

(Continued)

*Primary Examiner* — Jesse Elbin
(74) *Attorney, Agent, or Firm* — Maschoff Brennan

(57) ABSTRACT

There is provided a communication apparatus comprising a memory configured to store a plurality of pieces of audio contents, a playing member configured to produce a contents-based audio signal by playing a piece of audio contents stored in the memory, and a management circuit configured to identify a plurality of events occurring while the playing member is producing one of the contents-based audio signals, one of the events being associated with one of a plurality of event-associated audio signals and given a highest priority, to have the playing member pause and stop producing the contents-based audio signal and to produce one of the event-associated audio signals associated with the identified event in a case where the identified event is given the highest priority.

7 Claims, 10 Drawing Sheets

FOREIGN PATENT DOCUMENTS

| | | |
|---|---|---|
| JP | 2003-169372 | 6/2003 |
| JP | 2003-319021 | 11/2003 |
| JP | 2004-080395 | 3/2004 |
| JP | 2006-033328 | 2/2006 |
| WO | WO-99/43136 | 8/1999 |

OTHER PUBLICATIONS

Office Action dated Feb. 13, 2006, from European Patent Office in a corresponding European Patent Application No. 05024559.6.

Notification of Reasons for Rejection mailed Nov. 7, 2006, from the Japanese Patent Office in Japanese Patent Application No. 2004-328457, and English translation thereof.

Winter, Marie-Anne, "Neue Kamerahandys von SonyEricsson," Teltarif.de—print news, Jul. 16, 2004 (XP 007904655), 2 pages (http://www.teltarif.de/intern/action/print/arch/2004/kw29/s14309 . . . ).

Sony Ericsson, Introduction, Getting to know your P910i, Jul. 16, 2004 (XP002407459) (pp. 9-204) (196 sheets).

Sony-Ericcson User Manual for mobile phone P900, Aug. 2003, (XP002336977) (pp. 1-215) (108 sheets).

EPO Communication from European Patent Office dated Dec. 29, 2006, in EP Application 05-024 559.6-2414 (5 pages).

EPO Communication from European Patent Office dated Oct. 23, 2007, in EP Application 05 024 559.6-2414 (6 pages).

EPO Communication from European Patent Office dated May 13, 2008, in EP Application No. 05 024 559.6-2414 (4 pages).

"Notification of Reasons for Rejection", mailed Nov. 14, 2008, from the Japanese Patent Office for Japanese Patent Application No. 2007-001324 (6 pages).

"Examiner's Decision of Rejection", mailed Apr. 3, 2009, from the Japanese Patent Office for Japanese Patent Application No. 2007-001324 (3 pages).

"Notification of Reasons for Rejection", mailed Nov. 18, 2008, from the Japanese Patent Office for Japanese Patent Application No. 2008-275481 (5 pages).

"Notification of Reasons for Rejection", mailed Jan. 16, 2009, from the Japanese Patent Office for Japanese Patent Application No. 2008-275481 (5 pages).

"Notification of Reasons for Rejection", mailed Nov. 18, 2008, from the Japanese Patent Office for Japanese Patent Application No. 2008-275482 (4 pages).

"Notification of Reasons for Rejection", mailed Jan. 16, 2009, from the Japanese Patent Office for Japanese Patent Application No. 2008-275482 (11 pages).

"Notification of Reasons for Rejection", mailed Nov. 21, 2008, from the Japanese Patent Office for Japanese Patent Application No. 2008-275483 (8 pages).

"Notification of Reasons for Rejection", mailed Jan. 16, 2009, from the Japanese Patent Office for Japanese Patent Application No. 2008-275483 (5 pages).

"Notification of Reasons for Rejection", mailed Feb. 6, 2009, from the Japanese Patent Office for Japanese Patent Application No. 2008-322699 (15 pages).

"Notification of Reasons for Rejection", mailed Feb. 6, 2009, from the Japanese Patent Office for Japanese Patent Application No. 2008-322700 (16 pages).

"Examiner's Decision of Rejection", mailed Apr. 3, 2009, from the Japanese Patent Office for Japanese Patent Application No. 2008-322700 (3 pages).

User Guide in Japanese Patent Application No. 2007-001324, mailed Nov. 14, 2009 (3 pages).

User Guide in Japanese Patent Application No. 2008-275483, mailed Nov. 21, 2009 (4 pages).

User Guide in Japanese Patent Application No. 2008-275482, mailed Jan. 16, 2010 (7 pages).

User Guide in Japanese Patent Application No. 2008-322700, mailed Feb. 6, 2010 (12 pages).

User Guide in Japanese Patent Application No. 2008-322699, mailed Feb. 6, 2010 (5 pages), FOMA N900i.

User Guide in Japanese Patent Application No. 2008-322699, mailed Feb. 6, 2010 (6 pages), FOMA D900i.

* cited by examiner

| ROW | EVENT | PRIORITY |
|---|---|---|
| 1 | CALL ARRIVAL | HIGH |
| 2 | BATTERY DISCHARGE | HIGH |
| 3 | SCHEDULED APPOINTMENT | HIGH |
| 4 | | HIGH |
| 5 | | HIGH |
| 6 | KEY OPERATION | LOW |
| 7 | E-MAIL ARRIVAL | LOW |
| 8 | DATA FILE OPENING | LOW |
| 9 | DATA FILE ATTACHING | LOW |
| 10 | WRONG E-MAIL OPERATION | LOW |
| 11 | | LOW |
| 12 | | LOW |
| 13 | ACCESS TO WEB CONTENTS | SELECTABLE |
| 14 | | SELECTABLE |
| 15 | | SELECTABLE |

FIG. 3

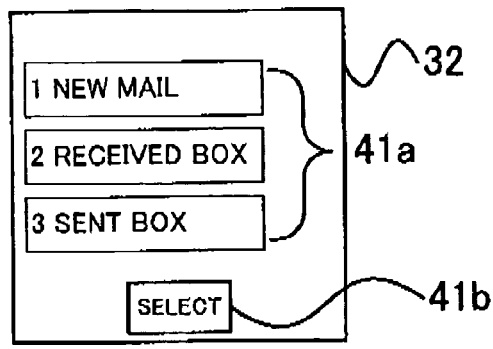
FIG. 5
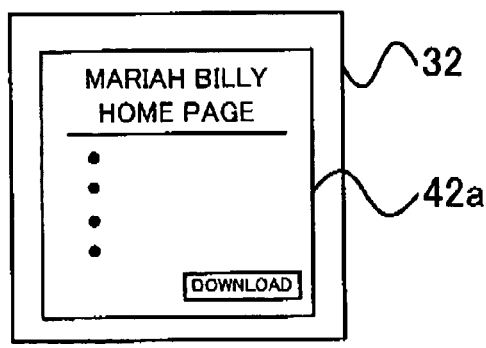
FIG. 6
| APPOINTMENT | START | END |
|---|---|---|
| WEEKLY MEETING | MAR. 8, 2005, 10:00 | MAR. 8, 2005, 11:00 |
| LUNCH WITH M. B. | MAR. 10, 2005, 12:30 | MAR. 10, 2005, 13:30 |
| CALL TO X. Y. | MAR. 11, 2005, 15:10 | MAR. 11, 2005, 15:30 |
FIG. 7

COMMUNICATION APPARATUS

CROSS REFERENCE TO RELATED APPLICATIONS

This application is based upon and claims the benefit of priority from the prior Japanese Patent Application No. 2004-328457 filed on Nov. 12, 2004; the entire contents of which are incorporated herein by reference.

FIELD OF THE INVENTION

The present invention relates to a communication apparatus configured to play pieces of audio contents.

DESCRIPTION OF THE BACKGROUND

There is known a communication apparatus configured to store a plurality of pieces of audio contents or audio and video contents on a memory thereof and to play those contents. The communication apparatus plays those contents operated by a user while not being busy with other tasks, e.g., processing voice communications.

In a case where a call arrives while those contents are played, the communication apparatus informs the user of the call arrival. When the user is not aware of the call arrival as he or she is listening to, or sometimes watching, the contents being played, the radio apparatus produces a sound different from the contents being played to draw attention of the user. This conventional communication apparatus is disclosed in Japanese Patent Publication (Kokai), 2002-314633.

There is known another communication apparatus that does not produce a calling sound while playing contents not to disturb the user's listening to or watching those contents. This conventional communication apparatus is disclosed in Japanese Patent Publication (Kokai), 2004-80395.

The former conventional communication apparatus has a disadvantage that the user may be disturbed while enjoying those contents. The latter conventional communication apparatus has a disadvantage that the user may not be aware of call arrivals. Both of these conventional ones have another disadvantage of not coping with an event other than call arrivals that occurs while playing those contents.

SUMMARY OF THE INVENTION

According to an aspect of the present invention, there is provided a communication apparatus comprising a memory configured to store a plurality of pieces of audio contents, a playing member configured to produce a contents-based audio signal by playing a piece of audio contents stored in the memory, and a management circuit configured to identify a plurality of events occurring while the playing member is producing one of the contents-based audio signals, one of the events being associated with one of a plurality of event-associated audio signals and given a highest priority, to have the playing member pause and stop producing the contents-based audio signal and to produce one of the event-associated audio signals associated with the identified event in a case where the identified event is given the highest priority.

BRIEF DESCRIPTION OF THE DRAWINGS

FIG. 3 shows a table of a plurality of events occurring to the communication apparatus 1 and a priority given to each of the events in the first embodiment.

FIG. 5 is an example of a page for e-mail operation shown on the LCD 32 in the first embodiment.

FIG. 6 is an example of a web page opened on the LCD 32 in the first embodiment.

FIG. 7 is an example of a list of schedules shown on the LCD 32 in the first embodiment.

DETAILED DESCRIPTION OF THE INVENTION

Figure 1:
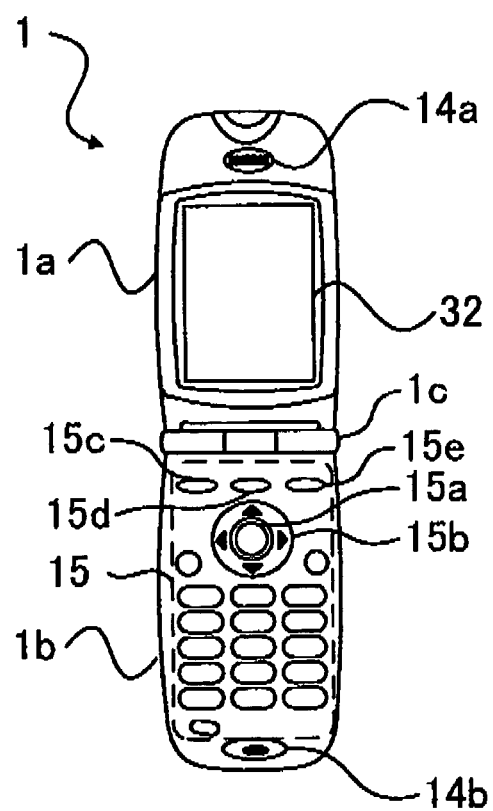
FIG. 1 is a front view of a communication apparatus 1 of the first embodiment of the present invention.

A first embodiment of the present invention will be described with reference to FIG. 1 through FIG. 8. FIG. 1 is a front view of a communication apparatus 1 in the first embodiment, e.g. a mobile phone. The communication apparatus 1 has a first housing 1a, a second housing 1b and a hinge part 1c. The first housing 1a and the second housing 1b are joined via the hinge part 1c and configured to open and close to each other.

The communication apparatus 1 has a first speaker 14a and a liquid-crystal display (LCD) 32 accompanied with a backlight (not shown) on a front face of the first housing 1a. The first speaker 14a may be used for sounding received voices. The communication apparatus 1 has a second speaker (not shown) on a back face of the first housing 1a to be used for producing sounds, which will be explained later.

The LCD 32 may be used for displaying various text or pictures including pieces of information having been entered into the communication apparatus 1 and a state of the communication apparatus 1, a prompt, a cursor, and so forth.

The communication apparatus 1 has a microphone 14b and an operating member 15 on a front face of the second housing 1b. The microphone 14b may be used for picking up voices to be sent. The operating member 15 includes a plurality of keys shown encircled by a dashed line in FIG. 1. The communication apparatus 1 has an antenna (not shown) on a back face of the first housing 1a or on a back face of the second housing 1b.

The operating member 15 includes a center key 15a and a cursor key 15b. The center key 15a may be used for entering determinations or selections. The cursor key 15b is placed surrounding the center key 15a, and may be used for moving the cursor in an upward, downward, rightward or leftward direction displayed on the LCD 32.

The operating member 15 includes a first soft key 15c, a second soft key 15d and a third soft key 15e. These soft keys 15c, 15d and 15e are used for selecting various functions displayed in the lower portion of the LCD 32. The operating member 15 includes some numeric keys (shown with no reference numerals) to be used for entering alphabets, numerals and characters. The operating member 15 includes some keys for particular functions (shown with no reference numerals), e.g. turning on or off power supply.

Figure 2:
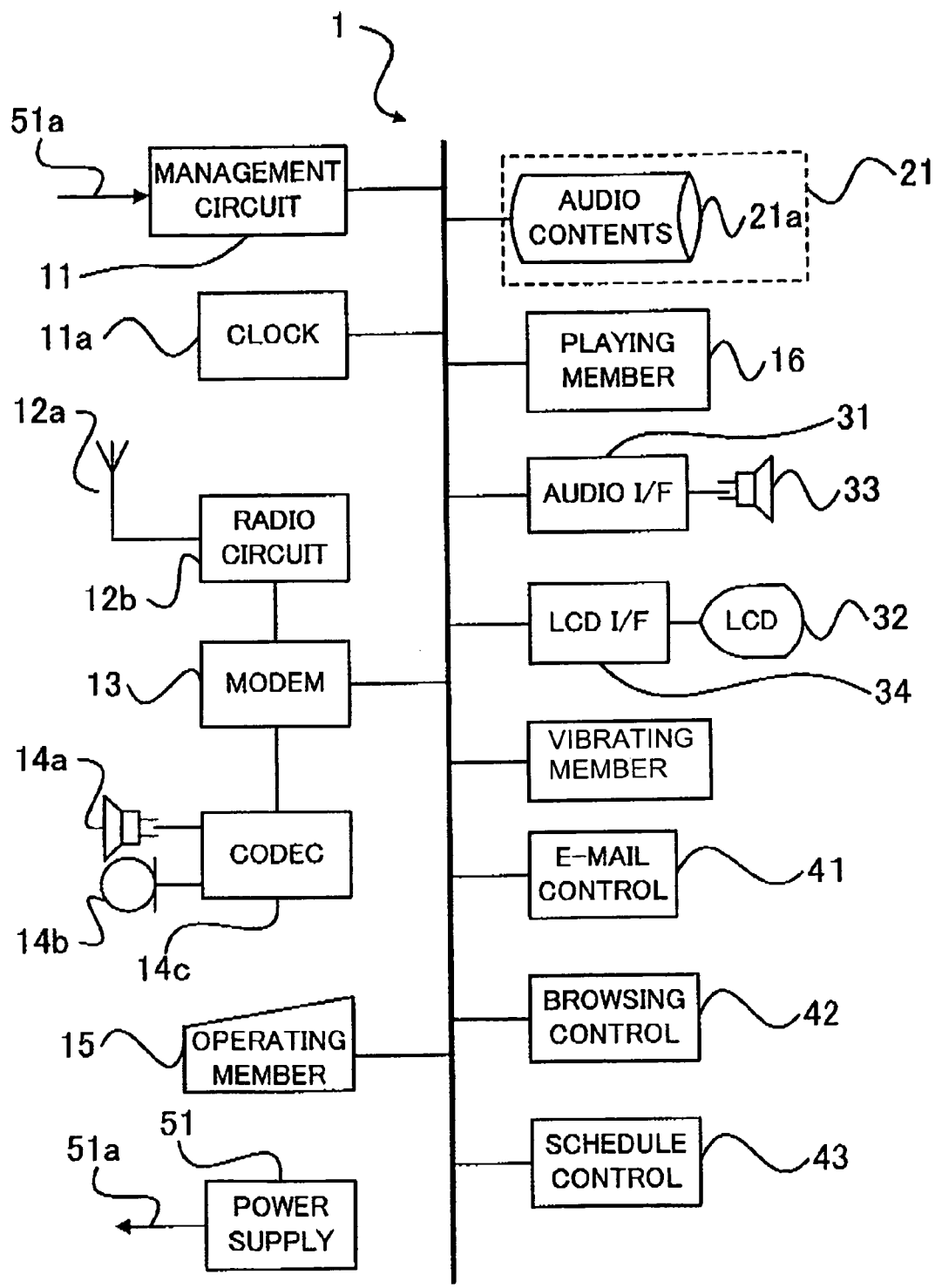
FIG. 2 is a block diagram of a main part of the communication apparatus 1 of the first embodiment.

FIG. 2 is a block diagram of a main part of the communication apparatus 1 in the first embodiment. Each of portions given the reference numeral 14a, 14b, 15 and 32 is a same as the corresponding one shown in FIG. 1.

The communication apparatus 1 has an antenna 12a, a radio circuit 12b and a modem 13. Radio signals received by the antenna 12a is amplified and down-converted by the radio circuit 12b and demodulated by the modem 13, and voices or data carried by the received radio signals are obtained as received baseband signals. Baseband signals of voices or data to be sent is applied to the modem 13 to be carried by transmission frequencies, which are up-converted and amplified by the radio circuit 12b and radiated by the antenna 12a.

The communication apparatus 1 has a codec 14c coding voice signals picked up by the microphone 14b to produce baseband signals of voices to be sent, and decoding received baseband signals of voices to drive the first speaker 14a.

The communication apparatus 1 has an LCD interface 34 to which digital signals of text, pictures and so forth are applied, driving each of the pixels of the LCD 32 in a horizontally and vertically synchronized manner.

The communication apparatus 1 has an e-mail control member 41 that controls transmission and reception of e-mails. Transmission of e-mails is a kind of the data transmission through the modem 13, the radio circuit 12b and the antenna 12a. Reception of e-mails is a kind of the data reception through the antenna 12a, the radio circuit 12b and the modem 13.

The communication apparatus 1 has a browsing control member 42 that controls transmission and reception of data exchanged with a plurality of websites. Transmission or reception of such data is another kind of the data transmission or reception through the modem 13, the radio circuit 12b and the antenna 12a. The communication apparatus 1 has a schedule control member 43 that controls entering and managing schedules.

The communication apparatus 1 has a memory 21 configured to store a plurality of pieces of audio contents 21a thereon. Each of the pieces of audio contents 21a may be, e.g. a piece of music, a lecture or an auditory performance, and may be downloaded by the browsing control member 42 or may be attached to received e-mails and obtained by the e-mail control member 41.

The communication apparatus 1 has a playing member 16, an audio interface 31 and a second speaker 33. The playing member 16 is configured to play each of the pieces of audio contents 21a stored in and read out of the memory 21, and to produce each of a plurality of contents-based audio signals. Each of the contents-based audio signals, a series of electrical waves in an analog or a digital form corresponding to each of the pieces of audio contents 21a, is applied to the audio interface 31 to play each of a plurality of contents-based sounds from the second speaker 33.

The playing member 16 is configured to play each of a plurality of pieces of audio contents included in a data file attached to an e-mail under control of by the e-mail control member 41. The playing member 16 is configured to play each of a plurality of pieces of audio contents opened or downloaded from an accessed website under control of the browsing control member 42. The communication apparatus 1 may be configured without having the second speaker 33 for which the first speaker 14a may be substituted.

The communication apparatus 1 has a management circuit 11 and a clock 11a. The management circuit 11 manages each portion of the communication apparatus 1 shown in FIG. 2, using a clock signal generated by the clock 11a as necessary.

The operating member 15 has a plurality of numeric keys to be used for phone number entering operations and a plurality of functional keys. If one of the keys of the operating member 15 is pressed, the management circuit 11 identifies the pressed key, has the second speaker 33 sound a tone of the key operation, display an alphabet of the pressed key in the LCD 32, or performs a management operation. The operating member 15 may not have the second speaker 33 sound a tone of the key operation.

The management circuit 11 is configured to hold a set of data, e.g. in a tabular form shown in FIG. 3. In a first row of a table shown in FIG. 3, there is listed a first event, a call arrival, given a high priority. The first event is associated with a first event-associated sound indicating a call arrival. In a second row of the table, there is listed a second event, a battery discharge, given the high priority. The second event is associated with a second event-associated sound indicating a battery discharge.

In a third row of the table shown in FIG. 3, there is listed a third event, a scheduled appointment, given the high priority. The third event is associated with a third event-associated sound, a schedule alarm, indicating that a time of a scheduled appointment has come. A fourth and a fifth rows are saved for other unknown events possibly deserving the high priority.

Producing these event-associated sounds for the events given the high priority precedes playing the pieces of audio contents 21a. The management circuit 11 is configured to produce each of a plurality of event-associated audio signals being associated with each of these events. If one of these events occurs while one of the pieces of audio contents 21a is being played, the management circuit 11 has the playing member 16 pause to stop the play and produces one of the event-associated audio signals corresponding to the events given the high priority, which is applied to the audio interface 31 to produce each of the event-associated sounds from the second speaker 33.

A fourth row of the table shown in FIG. 3 is saved for an unknown fourth event possibly deserving the high priority. A fifth row of the table shown in FIG. 3 is saved for an unknown fifth event possibly deserving the high priority.

In a sixth row of the table shown in FIG. 3, there is listed a sixth event, key operation, given a low priority. The sixth event is associated with a sixth event-associated sound indicating that one of the keys of the operating member 15 has been pressed. If one of the keys of the operating member 15 is pressed, the management circuit 11 is informed of an identifier of the key, and may produce the fourth event-associated audio signal to be applied to the audio interface 31 to produce the fourth event-associated sound from the second speaker 33. The management circuit 11 may be preset not to produce the fourth event-associated audio signal.

In a seventh row of the table shown in FIG. 3, there is listed a seventh event, an e-mail arrival, associated with a seventh event-associated sound. In an eighth row of the table shown in FIG. 3, there is listed an eighth event, opening a data file attached to an e-mail to produce one or more sounds (an eighth event-associated sound) included therein.

In a ninth row of the table shown in FIG. 3, there is listed a ninth event, attaching a data file to an e-mail, associated with a seventh event-associated sound. In a tenth row of the table shown in FIG. 3, there is listed a tenth event, a wrong e-mail operation, associated with a tenth event-associated sound. Each of the seventh through, the tenth events is given the low priority.

The management circuit 11 is configured to produce each of a plurality of event-associated audio signals being associated with each of these events. If one of these events occurs while no piece of the audio contents 21a is being played, the management circuit 11 produces one of the event-associated audio signals corresponding to the events given the low priority, which is applied to the audio interface 31 to produce each of the event-associated sounds from the second speaker 33.

Producing these event-associated sounds for the events given the low priority, however, does not precede playing the pieces of the audio contents 21a. If one of these events occurs while one of the pieces of the audio contents 21a is being played, the management circuit 11 has the playing member 16 continue the play. An eleventh row of the table shown in FIG. 3 is saved for an unknown eleventh event possibly deserving the low priority. A twelfth row of the table shown in FIG. 3 is saved for an unknown twelfth event possibly deserving the low priority.

In a thirteenth row of the table shown in FIG. 3, there is listed a thirteenth event, accessing a website having audio contents or audio and video contents to be played as a thirteenth event-associated sound. The thirteenth event is given a selectable priority. The selectable priority may be selected high or low according to presetting the communication apparatus 1 by operating the operating member 15. The thirteenth event is associated with the played sound.

A fourteenth row of the table shown in FIG. 3 is saved for an unknown event possibly deserving the selectable priority. A fifteenth row of the table shown in FIG. 3 is saved for an unknown event possibly deserving the selectable priority.

The communication apparatus 1 has a power supply 51 including a battery (not shown) to be charged by a battery charger (not shown). The power supply 51 supplies dc power from the battery to each of the portions of the communication apparatus 1. The power supply 51 detects a voltage drop of the dc power down to a level lower than needed, and informs the management circuit 11 of a discharge alarm 51a.

Figure 4A:
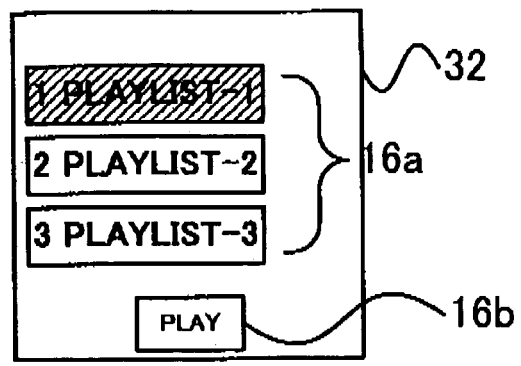
FIG. 4A is an example of a page for starting a play shown on the LCD 32 in the first embodiment.
Figure 4B:
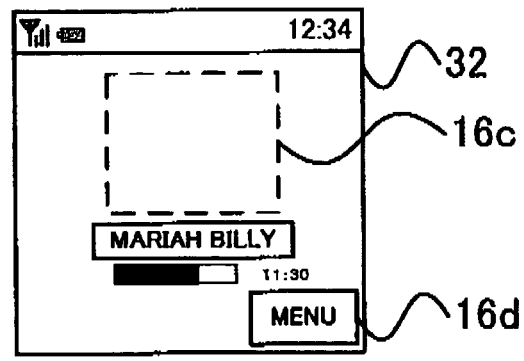
FIG. 4B is an example of a page for playing shown on the LCD 32 in the first embodiment.

A flow of operation for playing one or more of the pieces of audio contents 21a will be described with reference to FIGS. 4A, 4B and 4C. If the operating member 15 is operated in order that a play is started while the communication apparatus 1 is in a waiting status, the playing member 16 starts operation under control of the management circuit 11, and a page for starting a play is opened on the LCD 32, e.g. as shown in FIG. 4A.

The page for starting has a list of playlists 16a including three playlists, "PLAYLIST 1" associated with a numeral "1", "PLAYLIST 2" associated with a numeral "2" and "PLAYLIST 3" associated with a numeral "3". The page for starting has a second soft button 16b near the mid-lower end thereof, which is being assigned to "PLAY". In FIG. 4A shaded is, e.g. "Playlist 1" as a default option.

Each piece of the audio contents 21a has an identifier thereof. Each of the above playlists includes one or more identifiers in some order. One of the above playlists may be selected by pressing the cursor key 15b downward or upward, or pressing one of the numeric keys "1", "2" and "3" on the operating member 15.

If the second soft key 15d is pressed, the playing member 16 starts playing one or more of the pieces of audio contents 21a identified by the selected playlist in the order of the identifiers in that playlist. A page for playing is opened on the LCD 32, e.g. as shown in FIG. 4B.

The page for playing has a picture area 16c in which any static or moving picture may be displayed. The page for playing has a third soft button 16d near the right lower end thereof, which is being assigned to "MENU". The page for playing may have a bar which indicates time since a play starts, a title or a name of an artist of one of the pieces of audio contents 21a being played.

In the picture area 16c, may be displayed a static or moving picture that has been downloaded together and stored in the memory 21 in association with the piece of audio contents 21a being played. In the picture area 16c, may be displayed a static or moving picture stored in the playing member 16 and unrelated to the piece of audio contents 21a being played.

Figure 4C:
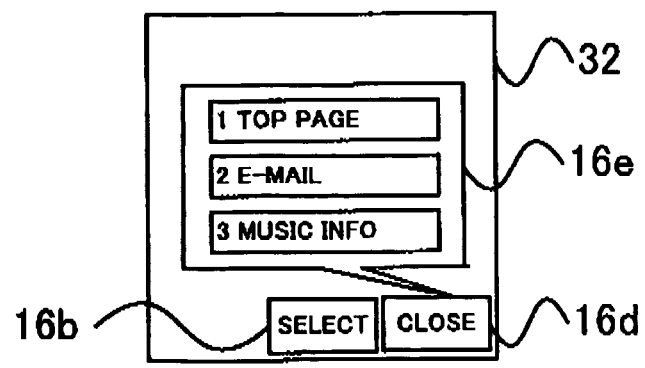
FIG. 4C is an example of a menu page shown on the LCD 32 in the first embodiment.

If the third soft key 15e is pressed while the play is going on, a menu page is opened on the LCD 32, e.g. as shown in FIG. 4C and the play still continues. A menu 16e is displayed as a pop-up window on the LCD 32 as shown in FIG. 4C. The menu 16e includes three sub-menus, "TOP PAGE" associated with a numeral "1", "E-MAIL" associated with a numeral "2" and "MUSIC INFO" associated with a numeral "3".

In FIG. 4C, the third soft button 16d is being assigned to "CLOSE". If the third soft key 15e is pressed, the menu page is closed and the page for playing shown in FIG. 4B is opened on the LCD 32. In FIG. 4C, one of the sub-menus may be selected by pressing the cursor key 15b downward or upward, or pressing one of the numeric keys "1", "2" and "3" on the operating member 15. The selected sub-menu is determined by pressing the center key 15a.

If the sub-menu of "TOP PAGE" is selected and determined in FIG. 4C, the page for playing is closed and a top page is opened on the LCD 32, and the communication apparatus 1 goes back to the waiting status while the play continues. If the operating member 15 is operated in order that some kinds of operation (e-mails, browsing, schedules or call requests) are selected and started while the communication apparatus 1 is in the waiting status, the selected operation starts while the play continues.

If the sub-menu of "E-MAIL" is selected and determined in FIG. 4C, the page for playing is closed and the e-mail control member 41 starts operation while the play continues. A page for e-mail operation is opened on the LCD 32. If the sub-menu of "MUSIC INFO" is selected and determined in FIG. 4C, the page for playing is closed and a page for pieces of information, e.g. a title, a name of an artist or a name of a contents provider of one of the pieces of audio contents 21a being played, is opened.

Each of the contents-based audio signals produced by the playing member 16 or each of the event-associated audio signals produced by the management circuit 11 is applied to the audio interface 31, decoded as necessary and amplified therein to produce a contents-based or an event-associated sound from the second speaker 33. The second speaker 33 may not be a single speaker but may be formed by two or more speakers each of which is assigned to contents-based sounds and event-associated sounds separately.

If the operating member 15 is operated so that the e-mail control member 41 starts operation under control of the management circuit 11, a page for e-mail operation is opened on the LCD 32, e.g. as shown in FIG. 5. A list of e-mail operation 41a is on that page and includes three e-mail sub-menus, "NEW MAIL" associated with a numeral "1", "RECEIVED BOX" associated with a numeral "2" and "SENT BOX" associated with a numeral "3". In FIG. 5, one of the e-mail sub-menus may be selected by pressing the cursor key 15b downward or upward, or pressing one of the numeric keys "1", "2" and "3" of the operating member 15. The second soft key 15d is pressed in order that the selected e-mail sub-menu is determined.

The e-mail sub-menu of "NEW MAIL" represents a function of entering and editing an e-mail to be sent. The e-mail sub-menu of "RECEIVED BOX" represents a function of displaying a title and text of a received e-mail on the LCD 32 and opening a file attached, if any, to the received e-mail. The e-mail sub-menu of "SENT BOX" represents a function of displaying a title and text of a sent e-mail on the LCD 32 and opening a file attached, if any, to the sent e-mail.

While the list of e-mail operation 41 is on the LCD 32, one of the e-mail sub-menus is selected by pressing the cursor key 15b upward or downward or pressing a numeric key of the operating member 15 corresponding to the numeral associated with one of the e-mail sub-menus. Pressing the second soft key 15d enables the e-mail control member 41 to activate the selected e-mail sub-menu.

If the e-mail sub-menu of "NEW MAIL" is selected and determined (by the second soft key 15d to be pressed, e.g.) in FIG. 5, the operating member 15 may be operated in order that a title and a piece of text of each of new e-mails to be sent are entered and edited under control of the e-mail control member 41. If a data file formed by one or more pieces of the audio contents 21 needs being attached to an entered e-mail, a list of the pieces of audio contents 21a may be displayed on a page shown on the LCD 32. One or more of the pieces of audio contents 21a in the list may be selected and included in the attached data file.

The entered e-mail with or without attached files is sent to an addressee through the modem 13, the radio circuit 12b and the antenna 12a under control of the management circuit 11. A data file not based on the pieces of audio contents 21a, e.g. a picture file formed by pictures taken by a camera and classified in data folders or a downloaded sound or picture file, may be attached to the entered e-mail. In such a case, a list of such sound or picture files is displayed on a page shown on the LCD 32.

The e-mail control member 41 starts operation for receiving under control of the management circuit 11 which informs the e-mail control member 41 of an e-mail arrival. The e-mail control member 41 may store a title and a piece of text of each of the received e-mail thereon. The e-mail control member 41 may store a data file attached to the received e-mail, if any, in the memory 21 in a case where pieces of contents of the attached data file may be added to the pieces of audio contents 21a. In other cases, the e-mail control member 41 may store a attached data file, e.g. a picture file, on each of the data folders.

If the e-mail sub-menu of "RECEIVED BOX" is selected and determined (by the second soft key 15d to be pressed, e.g.) in FIG. 5, a title and a piece of text of each received email stored in the e-mail control member 41 is displayed on a page shown on the LCD 32 under control of the e-mail control member 41. A data file attached to a received e-mail and added to the pieces of audio contents 21a, if any, may be opened and one or more pieces of audio contents included therein may be played by the playing member 16 under control of the e-mail control member 41.

If the e-mail sub-menu of "SENT BOX" is selected and determined (by the second soft key 15d to be pressed, e.g.) in FIG. 5, a title and a piece of text of each sent e-mail stored in the e-mail control member 41 is displayed on a page shown on the LCD 32 under control of the e-mail control member 41. A data file selected from the audio contents 21a and attached to a sent e-mail, if any, is played by the playing member 16 under control of the e-mail control member 41.

The operating member 15 is operated so that the browsing control member 42 starts operation under control of the management circuit 11, and enables a plurality of websites each of which is identified by a uniform resource locator (URL) thereof to be accessed. The browsing control member 42 may manage to access each of a plurality of pieces of web contents on a website, i.e. to play or download each of the pieces of web contents from the website according to a feature of the website. FIG. 6 shows an example of a web page 42a opened on the LCD 32.

In a case where a received e-mail includes an URL in the text and the operating member 15 is operated in order that the URL is accessed while the text of the received e-mail is being shown on the LCD 32, the browsing control member 42 may enable an immediate access to that URL after starting operation.

The operating member 15 is operated so that the schedule control member 43 starts operation under control of the management circuit 11. The operating member 15 may be operated in order that an appointment, a date and a time of each of a start and an end of the appointment, and a date and a time of a schedule alarm of the appointment are entered and stored in a list of schedules included in the schedule control member 43.

FIG. 7 shows an example of a list of schedules 43a including an appointment 43b, a date and a time of a start 43c and a date and a time of an end 43d of each schedule. In FIG. 7, it is assumed that a date and a time of a schedule alarm equal to the date and the time of the start of an appointment, and are not included in the list of schedules 43a distinctively. The schedule control member 43, referring to the list of schedules 43a and watching time on the clock 11a, asks the management circuit 11 to produce a schedule alarm at a time when a scheduled appointment starts.

A flow of processing of an event occurring while the playing member 16 is playing one of the pieces of audio contents 21a will be described with reference to a flow chart shown in FIG. 8. The management circuit 11 starts processing ("START") and has the playing member 16 start playing one of the pieces of audio contents 21a (step "S1").

The management circuit 11 watches if one of the events shown in FIG. 3 occurs (i.e., the management circuit 11 receives a call arrival or a battery discharge alarm, e.g.). If such an event occurs ("YES" of step "S2"), the management circuit 11 identifies that event and a priority thereof referring to the table shown in FIG. 3 (step "S3").

In a case where the priority of that event is high ("HI" of step "S3"), the management circuit 11 has the playing member 16 pause to stop the play (step "S4"), and the contents-based sound which has been played stops being played. The management circuit 11 produces an event-associated audio signal associated with the identified event, which is applied to the audio interface 31 and produced as an event-associated sound from the second speaker 33 (step "S5"). The flow of processing goes to step "S7" thereafter.

In a case where no event occurs at step "S2", or the priority of the event is low ("LO" of step "S3"), the management circuit 11 has the playing member 16 continue the play (step "S6"). The management circuit 11 watches a progress of the play. If the play reaches an end thereof ("YES" of step "S7"), the management circuit 11 ends processing ("END"). Before the play reaches the end ("NO" of step "S7") the management circuit 11 again watches if one of the events shown in FIG. 3 occurs (back to step "S2").

In a case where the priority of the event is selectable ("SEL" of step "S3"), the management circuit 11 looks into which priority, high or low, has been selected and given to the event. In a case where the high priority has been given ("HI" of step "S8"), the steps "S4" and "S5" are followed. In a case where the low priority has been given ("LO" of step "S8"), the steps "S6" and "S7" are followed.

According to the first embodiment described above, occurrences of important events to a communication apparatus may not be overlooked while a piece of audio contents stored in an internal memory is being played, and playing a piece of audio contents may not be disturbed by occurrences of less important events.

A second embodiment of the present invention will be described with reference to FIG. 9 and FIG. 10. A communication apparatus in the second embodiment has a same configuration as the one of the communication apparatus 1 in the first embodiment and is given the same reference numeral. Each of portions of the communication apparatus 1 in the second embodiment is a same as the corresponding one given the same reference numeral in the first embodiment, and its explanation is omitted.

Figure 8:
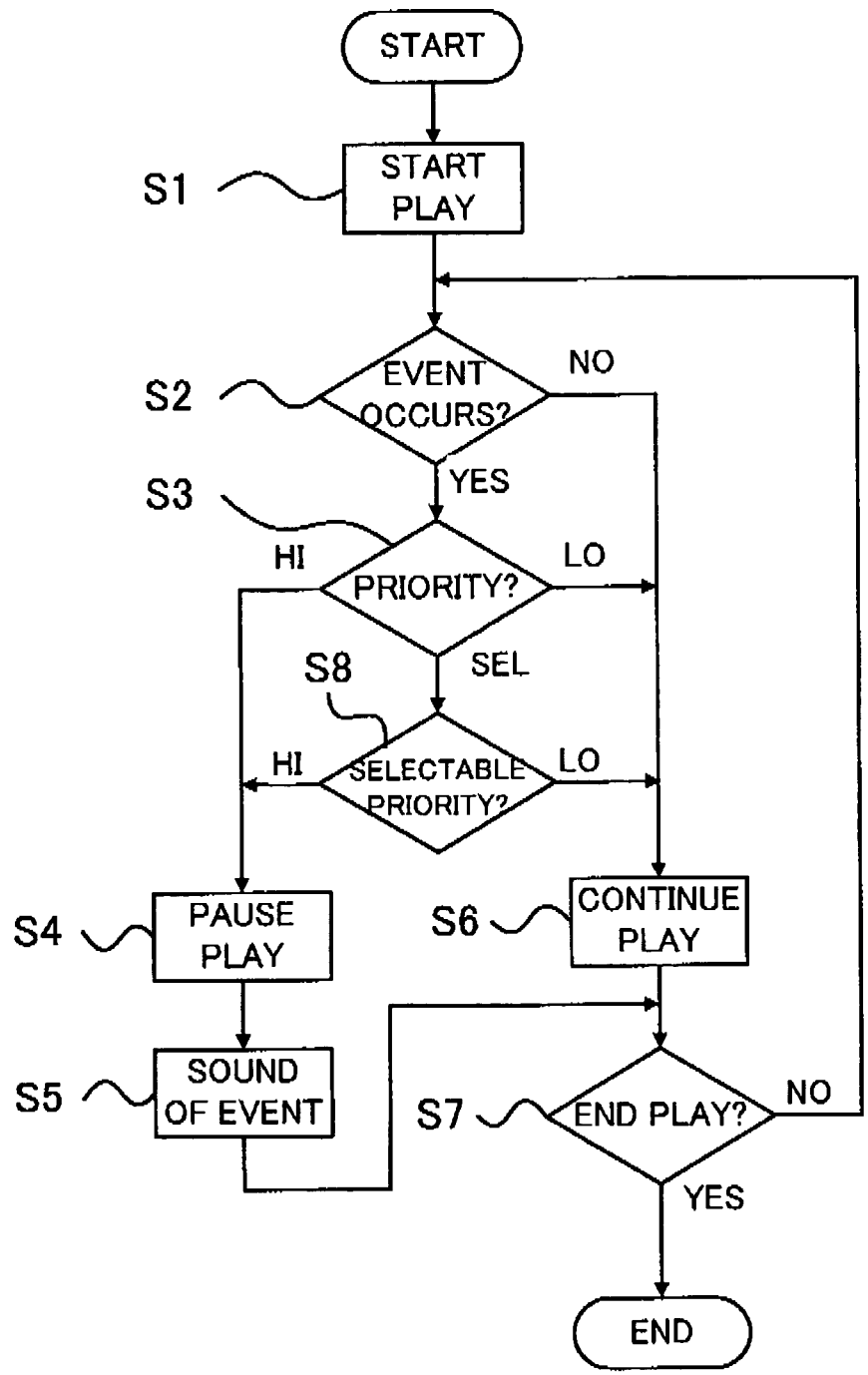
FIG. 8 is a flow chart of processing an event while a play is going on in the first embodiment.
Figure 9:
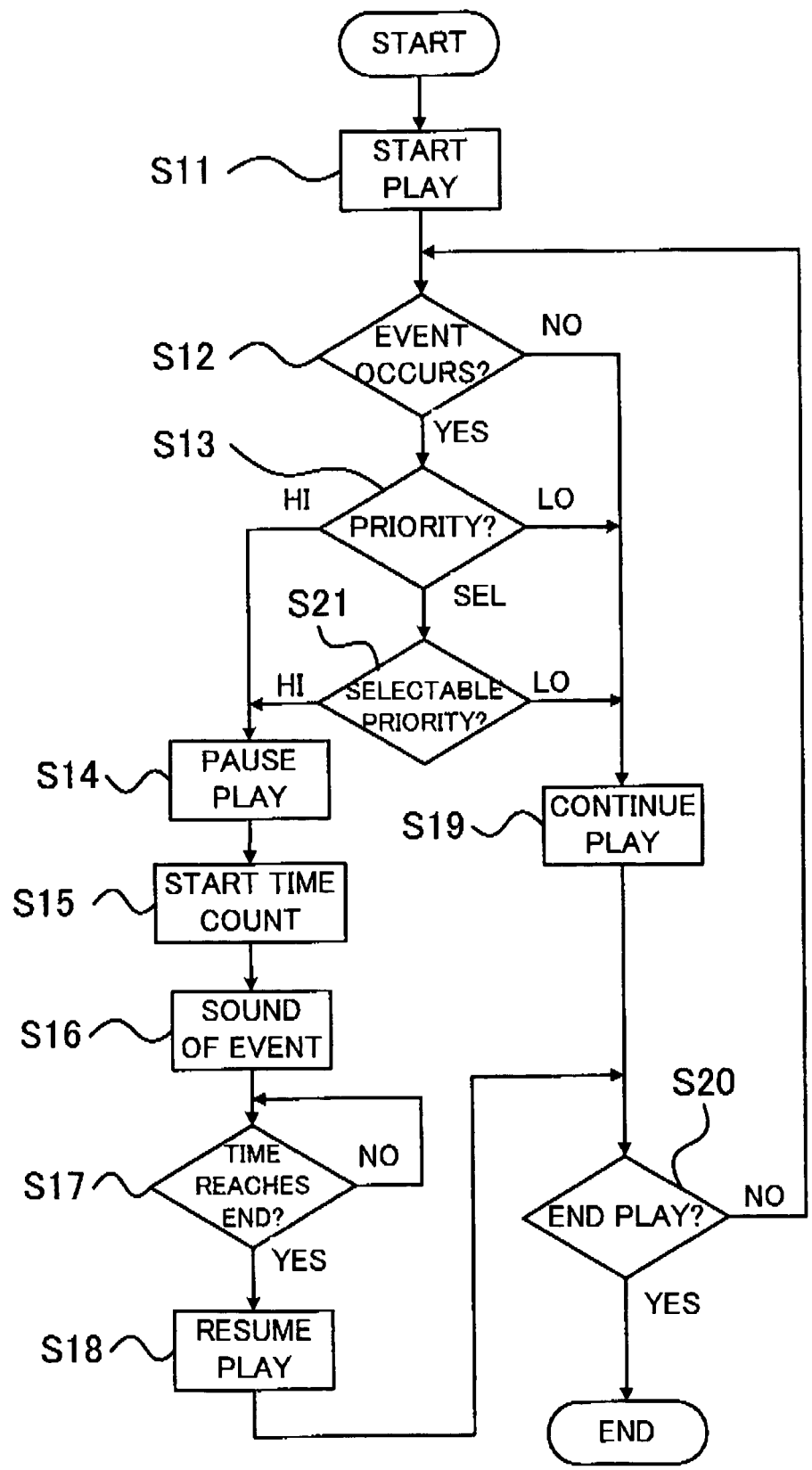
FIG. 9 is a flow chart of processing an event while a play is going on in the second embodiment.

FIG. 9 is a flow chart of processing of the communication apparatus 1 in the second embodiment. The steps "S11" through "S14" are equal to the steps "S1" through "S4" shown in FIG. 8 and their explanations are omitted.

After having the playing member 16 pause to stop the play (step "S14")", the management circuit 11 starts counting time referring to the clock 11a (step "S15"). The management circuit 11 produces an event-associated audio signal associated with the identified event, which is applied to the audio interface 31 and produced as an event-associated sound from the second speaker 33 (step "S16").

If the counted time reaches a predetermined end ("YES" of step "S17"), the management circuit 11 has the playing member 16 resume the play which has been stopped at the step "S14" (step "S18"), Before the counted time reaches the predetermined end ("NO" of step "S17"), the management circuit 11 continues counting time. The steps "S19" through "S21" are equal to the steps "S6" through "S8" shown in FIG. 8, and their explanations are omitted. The predetermined end may be entered into the management circuit 11 by operating the operating member 15 for presetting the communication apparatus 1.

The playing member 16 may memorize a passage of the contents-based audio signal being produced at a time of stopping the play at the step "S14". The term "passage" means a short part of the contents-based audio signal corresponding to a short part of the piece of audio contents 21. The playing member 16 may resume that contents-based audio signal at the step "S18" from the memorized passage, or another passage a few seconds earlier than the memorized passage, or a beginning of the contents-based audio signal.

Figure 10:
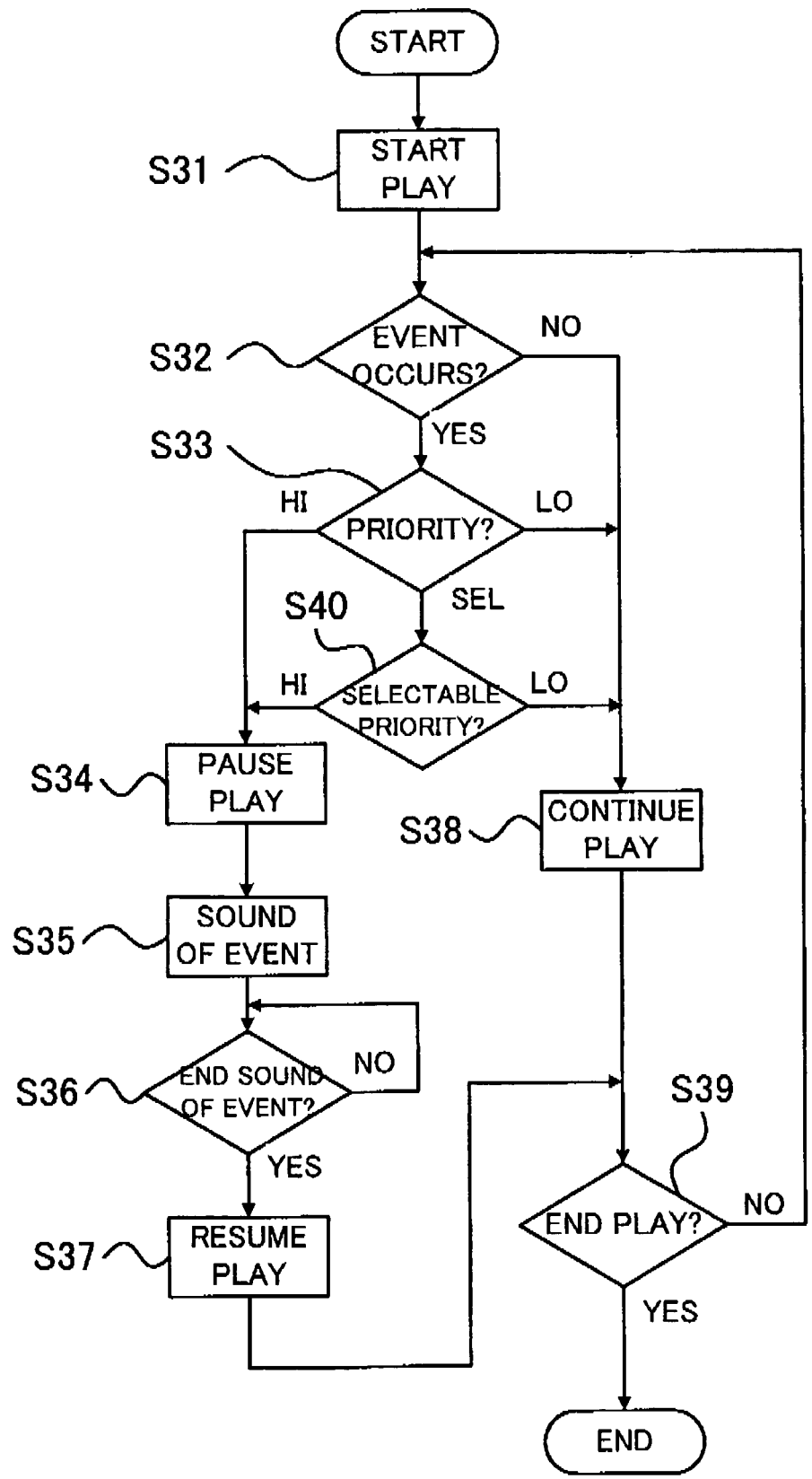
FIG. 10 is another flow chart of processing an event while a play is going on in the second embodiment of the present invention.

FIG. 10 is another flow chart of processing of the communication apparatus 1 in the second embodiment. The steps "S31" through "S35" are equal to the steps "S1" through "S5" shown in FIG. 8, and their explanations are omitted.

The management circuit 11 watches a progress of the event-associated sound started at the step "S35". If producing the event-associated sound ends ("YES" of step "S36"), the management circuit 11 has the playing member 16 resume the play which has been stopped at the step "S34" (step "S37"). Before the event-associated sound ends ("NO" of step "S36"), the management circuit 11 continues watching the progress of the event-associated sound. The steps "S38" through "S40" are equal to the steps "S6" through "S8" shown in FIG. 8, and their explanations are omitted.

The playing member 16 may memorize a passage of the contents-based audio signal being produced at a time of stopping the play at the step "S34". The playing member 16 may resume that contents-based audio signal at the step "S37" from the memorized passage, or another passage a few seconds earlier than the memorized passage, or a beginning of the contents-based audio signal.

According to the second embodiment described above, a play of a piece of audio contents disturbed by an occurrence of an event may be resumed after a process for the event is finished.

Figure 11:
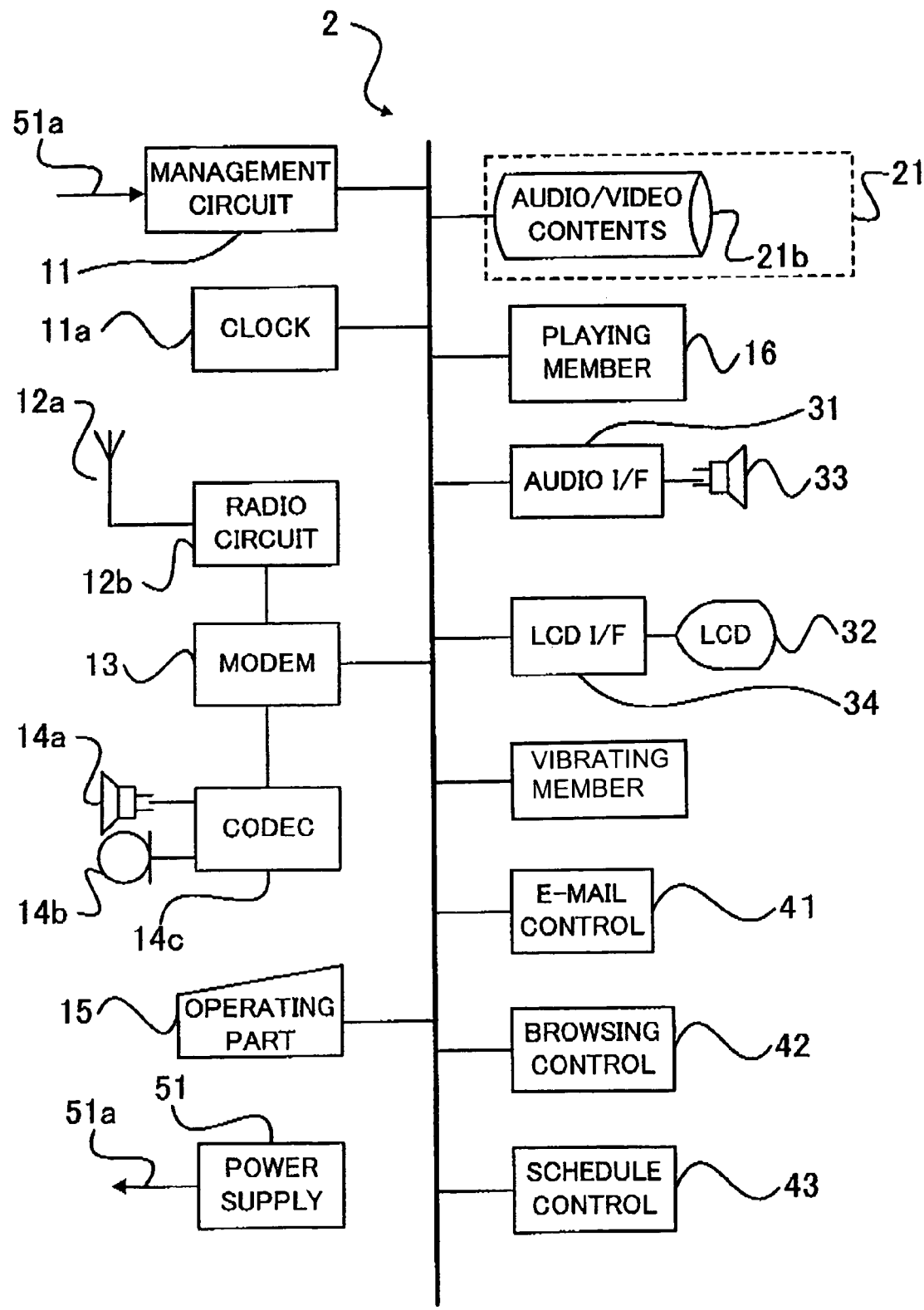
FIG. 11 is a block diagram of a main part of a communication apparatus 2 of the third embodiment of the present invention.

A third embodiment of the present invention will be described with reference to FIG. 11 and FIG. 12. FIG. 11 is a block diagram of a main part of a communication apparatus 2 in the third embodiment. Each of portions of the communication apparatus 2 shown in FIG. 11 is a same as the corresponding one of the communication apparatus 1 shown in FIG. 2 and given the same reference numeral. In FIG. 11, the memory 21 is configured to store a plurality of pieces of audio and video contents 21b thereon.

Each of the pieces of audio and video contents 21b may be formed by, e.g. a series of moving pictures and sounds combined in a movie, a piece of music and a series of pictures or a single static picture not directly related to each other, a piece of audio material alone, or a piece of video material alone. Each of the pieces of audio and video contents 21b may be downloaded by the browsing control member 42 or may be attached to received e-mails and obtained by the e-mail control member 41.

The playing member 16 is configured to play each of the pieces of audio and video contents 21b stored in and read out of the memory 21, and to produce each of a plurality of contents-based audio signals or each of a plurality of contents-based digital video signals. Each of the contents-based audio signals is applied to the audio interface 31 to play each of a plurality of contents-based sounds from the second speaker 33. Each of the contents-based digital video signals is applied to the LCD interface 34 to play each of a plurality of contents-based pictures to be displayed on the LCD 32.

The playing member 16 is configured to play each of a plurality of pieces of audio and video contents included in a data file attached to an e-mail under control of the e-mail control member 41. The playing member 16 is configured to play each of a plurality of pieces of audio and video contents opened or downloaded from an accessed website under control of the browsing control member 42.

Figure 12:
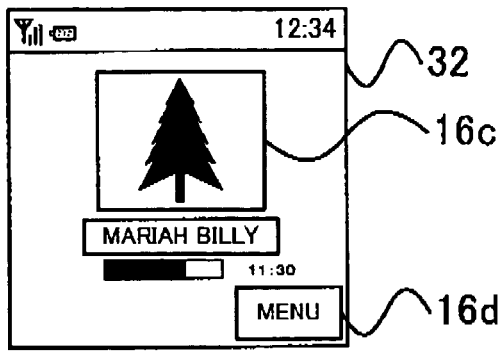
FIG. 12 is an example of a page for playing shown on the LCD 32 in the fourth embodiment of the present invention.

A flow of operation for playing one or more of the pieces of audio and video contents 21b is a same as the flow described with reference to FIGS. 4A, 4B and 4C in the first embodiment, except that the picture area 16c of the page for playing is used for pictures being played, e.g. as shown in FIG. 12.

A flow of processing of an event occurring while the playing member 16 is playing one of the pieces of audio and video contents 21b in the third embodiment is almost a same as each of the corresponding flows in the first and the second embodiments and may be described with reference to FIG. 8 through FIG. 10 with following differences.

With reference to FIG. 8 in the third embodiment, the playing member 16 starts playing one of the pieces of audio and video contents 21b at the step "S1". If the management circuit 11 has the playing member 16 pause to stop the play at the step "S4", the contents-based sound which has been played stops being played, and the contents-based picture which has been played may or may not stop being played. The other steps have no differences between the first and the third embodiments.

With reference to FIG. 9 in the third embodiment, the playing member 16 starts playing one of the pieces of audio and video contents 21b at the step "S11". If the management circuit 11 has the playing member 16 pause to stop the play at the step "S14", the contents-based sound which has been played stops being played, and the contents-based picture which has been played may or may not stop being played. If the management circuit 11 has the playing member 16 resume the play at the step "S18", the playing member 16 resumes playing the same contents-based sound possibly from a passage memorized at the step "S14", and may resume playing the same contents-based picture.

With reference to FIG. 10 in the third embodiment, the playing member starts playing one of the pieces of audio and video contents 21b at the step "S31". If the management circuit 11 has the playing member 16 pause to stop the play at the step "S34", the contents-based sound which has been played stops being played, and the contents-based picture which has been played may stop being played if the picture is a moving one, or may not stop being played if the picture is a static one. If the management circuit 11 has the playing member 16 resume the play at the step "S37", the playing member 16 resumes playing the same contents-based sound possibly from a passage memorized at the step "S34", and may resume playing the same contents-based picture.

According to the third embodiment described above, occurrences of important events to a communication apparatus may not be overlooked while a piece of audio and video contents are being played, and playing a piece of audio and video contents may not be disturbed by occurrences of less important events, A fourth embodiment of the present invention will be described with reference to the previous drawings and FIG. 13. In the fourth embodiment, a flow of processing of a call arrival occurring while one of the pieces of audio and video contents 21b is being played by the communication apparatus 2 which has been explained in the third embodiment.

Assume that the playing member 16 plays one of the pieces of audio and video contents 21b, and a contents-based sound is played from the second speaker 33 and a contents-based picture is played on the LCD 32. If a call arrives at the communication apparatus 2 in the meanwhile, the management circuit 11 identifies that the event having occurred is a call arrival and is given the high priority by referring to the first row of the table shown in FIG. 3.

The management circuit 11 takes one or more of following three actions, which are producing an event-associated sound for the call arrival from the second speaker 33, displaying a piece of text or a picture for the call arrival on the LCD 32, and activating a vibrating member of the communication apparatus 2. The operating member 15 may be operated for presetting each of the actions to be taken or not by the management circuit 11.

The management circuit 11 has the playing member 16 pause to stop the play before producing the event-associated audio signal indicating the call arrival. The management circuit 11 displays a piece of text or a picture for the call arrival instead of or overlaid on a page for playing, e.g. as shown in FIG. 13.

Figure 13:
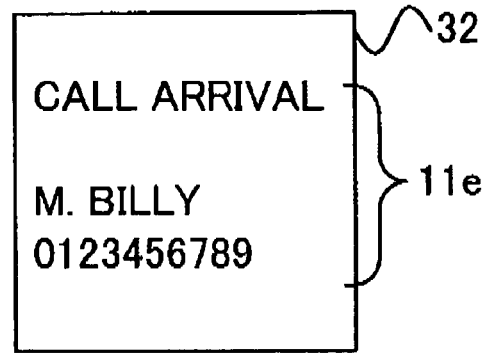
FIG. 13 is an example of a call arrival indication shown on the LCD 32 in the fourth embodiment.

In FIG. 13, there is shown an indication for a call arrival 11e including a message "CALL ARRIVAL", a phone number of a caller ("0123456789") and a name of the caller looked up in a directory (not shown) of the communication apparatus 2 by referring to the phone number. If a call arrives while a play is going on, the indication 11e may be overlaid on a page for playing, e.g. as shown in FIG. 13.

In a case where the operating member 15 is not operated to accept the call for a predetermined period of time while the indication of the call arrival continues, the management circuit 11 stops the above indication and have the playing member 16 resume the play.

There are several ways to resume the play. A first way is that the playing member 16 memorizes a passage of the contents-based sound at a time of pausing, and using the memorized information, resumes playing the contents-based sound with the second speaker 33 from the memorized passage, or another passage a few (e.g. five) seconds earlier than the memorized passage, or a beginning of the contents-based sound.

The playing member 16 may resume the contents-based picture in a manner similar to the contents-based sound as described above in a case where it is a moving one. Otherwise the page for playing, e.g. as shown in FIG. 4B, comes back on the LCD 32 after the management circuit 11 stops the indication 11e.

A second way is that the playing member 16 starts operation and a page for starting a play is opened on the LCD 32, e.g. as shown in FIG. 4A.

In a case where the operating member 15 is operated to accept the call during the predetermined period of time, the management circuit 11 controls the modem 13, the radio circuit 12b and the codec 14c so that a voice communication may be started. The management circuit 11 displays a piece of text or a picture indicating that the communication apparatus 1 is being used for a voice communication instead of or overlaid on the page for playing shown on the LCD 32.

The management circuit 11 has the playing member 16 resume the play after the operating member 15 is operated in order that the voice communication is finished. The above actions on each call arrival to be taken by the management circuit 11 is a same whether a piece of the audio and video contents 21b is being played or not, and so is a processing sequence for voice communications. The communication apparatus 2 thus shows call arrivals while playing by the playing member 16 is going on or not.

According to the fourth embodiment described above, an important notice of a call arrival may not be overlooked while a piece of audio and video contents is being played, and the play disturbed by the call arrival may be resumed after a process for the call arrival is finished.

Figure 14:
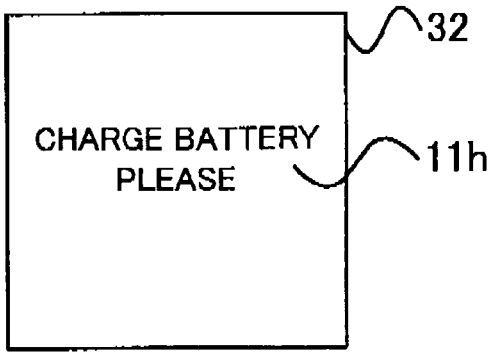
FIG. 14 is an example of a battery discharge indication shown on the LCD 32 in the fifth embodiment of the present invention.

A fifth embodiment of the present invention will be described with reference to the previous drawings and FIG. 14. In the fifth embodiment, a flow of processing of a battery discharge occurring while one of the pieces of audio and video contents 21b is being played by the communication apparatus 2 which has been explained in the third embodiment.

Assume that the playing member 16 is playing one of the pieces of audio and video contents 21b, and a contents-based sound is played from the second speaker 33 and a contents-based picture is played on the LCD 32. If the power supply 51 detects a voltage drop of the do power down to a level lower than needed and informs the management circuit 11 of a discharge alarm 51a, the management circuit 11 identifies that the event having occurred is a battery discharge and is given the high priority by referring to the second row of the table shown in FIG. 3.

The management circuit 11 takes one or more of following three actions, which are producing an event-associated sound indicating the battery discharge from the second speaker 33, displaying a piece of text or a picture indicating the battery discharge on a page shown on the LCD 32, and activating a vibrating member of the communication apparatus 2. The operating member 15 may be operated for presetting each of the actions to be taken or not by the management circuit 11.

The management circuit 11 has the playing member 16 pause to stop the play before producing the event-associated audio signal for the battery discharge. The management circuit 11 displays a piece of text or a picture indicating the battery discharge instead of a page for playing, e.g. as shown in FIG. 14, where shown is a message of battery discharge 11h saying "CHARGE BATTERY PLEASE".

The management circuit 11 has the playing member 16 stop the play so that the contents-based sound is no longer played and the contents-based picture is no longer played to save power consumption. According to the fifth embodiment described above, an important notice of a battery discharge may not be overlooked while playing a piece of audio and video contents.

Figure 15:
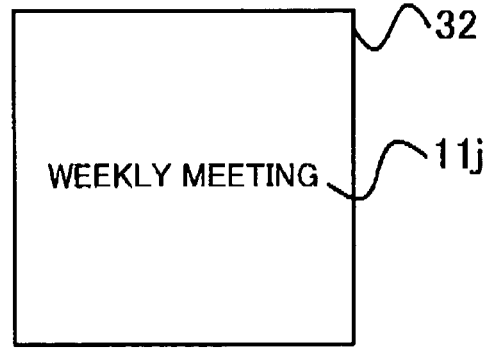
FIG. 15 is an example of a scheduled appointment indication shown on the LCD 32 in the sixth embodiment of the present invention.

A sixth embodiment of the present invention will be described with reference to the previous drawings and FIG. 15. In the sixth embodiment, a flow of processing of an event of a scheduled appointment occurring while a piece of the audio and video contents 21b is being played by the communication apparatus 2 which has been explained in the third embodiment.

Assume that the playing member 16 plays one of the pieces of audio and video contents 21b, and a contents-based sound is played from the second speaker 33 and a contents-based picture is played on the LCD 32. If a time indicated by the clock 11a reaches a date and time of a start 43c of one of the appointments listed in the list of schedules 43a shown in FIG. 7 in the meanwhile, the management circuit 11 identifies that the event having occurred is a start of a scheduled appointment and is given the high priority by referring to the third row of the table shown in FIG. 3.

The management circuit 11 takes one or more of following three actions, which are producing an event-associated sound from the second speaker 33 indicating that the starting time of the scheduled appointment has come, displaying a piece of text or a picture indicating the scheduled appointment on the LCD 32, and activating a vibrating member of the communication apparatus 2. The operating member 15 may be operated for presetting each of the actions to be taken or not by the management circuit 11.

The management circuit 11 has the playing member 16 pause to stop the play before producing the event-associated audio signal indicating the scheduled appointment. The management circuit 11 displays a piece of text or a picture indicating the scheduled appointment instead of or overlaid on a page for playing, e.g. as shown in FIG. 15, where shown is an indication of the scheduled appointment 11j, e.g. "WEEKLY MEETING". The indication of the scheduled appointment 11j may be overlaid on a page for playing, e.g. as shown in FIG. 4B.

The management circuit 11 resumes the play after the operating member 15 is operated in order that displaying a piece of text or a picture indicating the scheduled appointment is finished. The sixth embodiment described above is applicable to sounding a wake-up alarm when the time indicated by the clock 11a reaches a time predetermined in an alarm clock (not shown) included in the communication apparatus 1.

According to the sixth embodiment described above, an important notice of a scheduled appointment may not be overlooked while a piece of audio and video contents is being played, and the play disturbed by the scheduled appointment may be resumed after a process for the scheduled appointment is finished.

A seventh embodiment of the present invention will be described with reference to the previous drawings and FIG. 16. In the seventh embodiment, a flow of processing an event of key operation and an event of an e-mail arrival occurring while one of the pieces of the audio and video contents 21b is being played by the communication apparatus 2 which has been explained in the third embodiment. An "e-mail arrival" described here may be interpreted as receiving a notice of an arrival before receiving the text of that e-mail, or completing receiving the text and attached files, if any, of that e-mail.

Assume that the playing member 16 plays one of the pieces of audio and video contents 21b, and a contents-based sound is played from the second speaker 33 and a contents-based picture is played on the LCD 32.

If the operating member 15 is operated in the meanwhile, the management circuit 11 identifies that the event having occurred is operating one or more of the keys of the operating member 15 (key operation) and is given the low priority by referring to the sixth row of the table shown in FIG. 3. The management circuit 11 has the playing member 16 continue the play and does not produce an event-associated audio signal indicating the key operation.

If an e-mail arrives at the communication apparatus 2 in the meanwhile, the management circuit 11 identifies that the event having occurred is an e-mail arrival and is given the low priority by referring to the seventh row of the table shown in FIG. 3. The management circuit 11 has the playing member 16 continue the play and does not produce an event-associated audio signal indicating the e-mail arrival. The management circuit 11 may or may not activate a vibrating member of the communication apparatus 2.

The operating member 15 may be operated for presetting the management circuit 11 to produce an event-associated audio signal indicating that an e-mail arrives while the playing member 16 is playing none of the pieces of audio and video contents 21b. Such presetting is neglected and no event-associated audio signal is produced in a case where an e-mail arrives while one of the pieces of audio and video contents 21b is being played.

Figure 16:
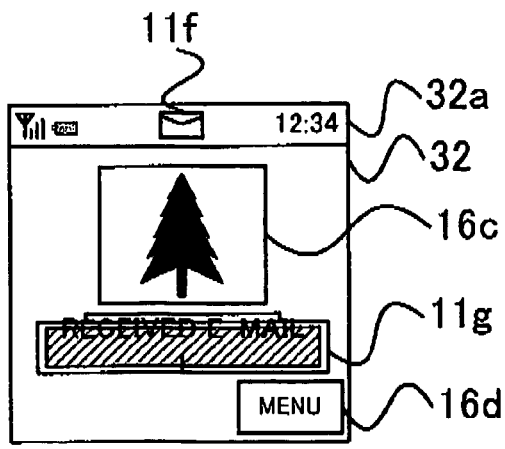
FIG. 16 is an example of an e-mail arrival indication shown on the LCD 32 in the seventh embodiment of the present invention.

The management circuit 11 displays a piece of text or a picture indicating the e-mail arrival overlaid on a page for playing making use of a blank part thereof, if any, e.g. as shown in FIG. 16. There is shown a symbol 11f indicating the e-mail arrival in a pictorial row 32a together with other symbols indicating electric field strength and battery endurance. The e-mail arrival may be indicated by a popped-up message 11g saying "RECEIVED E-MAIL 1" which means one e-mail has been received (and has not been opened yet).

If the center key 15a is pressed while the page indicating the e-mail arrival is on the LCD 32, the e-mail control member 41 enables displaying a title and a piece of text of the received e-mail on the LCD 32 and opening a file attached thereto, if any, in a manner similar to the case where the e-mail sub-menu "RECEIVED BOX" is selected on the page shown in FIG. 5. If the first soft key 15c is pressed while the page indicating the e-mail arrival is on the LCD 32, the indication disappears and the page for playing comes back on the LCD 32.

In the seventh row of the table shown in FIG. 3, the fifth event of an e-mail arrival may be given the high priority. In such a case, if an e-mail arrives at the communication apparatus 2 while the playing member 16 is playing one of the pieces of audio and video contents 21b, the management circuit 11 has the playing member 16 pause to stop the play. The management circuit 11 produces an event-associated audio signal indicating the e-mail arrival for a predetermined period of time. After finishing the event-associated audio signal, the management circuit 11 may have the playing member 16 resume the play. After resuming the play, the management circuit 11 may remain the indication of the e-mail arrival on the LCD 32.

The fifth event of an e-mail arrival may be given the selectable priority in the table shown in FIG. 3. In such a case, the operating member 15 may be operated for presetting the priority for e-mail arrivals to be high or low.

According to the seventh embodiment described above, a notice of an e-mail arrival may not be overlooked while a piece of audio and video contents is being played, and the play may not be disturbed by an indication of the e-mail arrival.

An eighth embodiment of the present invention will be described with reference to the previous drawings. In the eighth embodiment, a flow of processing an event of opening a data file attached to an e-mail, attaching a data file to an e-mail or wrong e-mail operation occurring while one of the pieces of audio and video contents 21b is being played by the communication apparatus 2 which has been explained in the third embodiment.

Assume that the playing member 16 plays one of the pieces of audio and video contents 21b, and a contents-based sound is played from the second speaker 33. In a case where one of the e-mail sub-menus "RECEIVED BOX" or "SENT BOX" is opened on the page shown in FIG. 5 while the play is going on, the management circuit 11 does not allow opening a data file attached to a received or a sent e-mail, as such opening is given the low priority in the eighth row of the table shown in FIG. 3 although enabled in a case where none of the pieces of audio and video contents 21b is being played.

Key operation for opening such a file is forbidden by, e.g. indicating no buttons to open the data file on a page for opening files shown on the LCD 32, or by indicating such a button being turned over not to be selected.

In a case where the e-mail sub-menu "NEW MAIL" is opened on the page shown in FIG. 5 while the play is going on, the management circuit 11 does not allow attaching a data file to an e-mail to be sent, as such attaching is given the low priority in the ninth row of the table shown in FIG. 3 although enabled in a case where none of the pieces of audio and video contents 21b is being played. Key operation for attaching such a data file is forbidden by, e.g. indicating no buttons to open the file on a page for attaching files shown on the LCD 32, or by indicating such a button being turned over not to be selected.

The management circuit 11 may allow attaching data files including none of the pieces of audio and video contents 21b, or not including the piece being played.

If an event of wrong e-mail operation occurs while the play is going on, the management circuit 11 identifies the event given the low priority by referring to the tenth row of the table shown in FIG. 3. The event of wrong e-mail operation is, e.g. trying to open a folder of received or sent e-mails being empty. The management circuit 11 has the playing member 16 continue the play and does not produce an event-associated audio signal indicating the wrong e-mail operation.

According to the eighth embodiment described above, playing a piece of audio and video contents is not disturbed by opening a data file attached to an e-mail or an occurrence of wrong e-mail operation, and data files including one or more pieces of audio and video contents are protected from wrong operation like deleting or rewriting which often occurs in a case where data files are attached to e-mails.

A ninth embodiment of the present invention will be described with reference to the previous drawings. In the ninth embodiment, a flow of processing an event of playing a sound by accessing a website having audio and video contents occurring while one of the pieces of audio and video contents 21b is being played by the communication apparatus 2 which has been explained in the third embodiment.

Assume that the playing member 16 plays one of the pieces of audio and video contents 21b, and a contents-based sound is played from the second speaker 33 and a contents-based picture is played on the LCD 32.

If the operating member 15 is operated in order that a piece of web contents on a website is accessed under control of the browsing control member 42, the management circuit 11 identifies that the event having occurred is an access to web contents and is given the selectable priority by referring to the thirteenth row of the table shown in FIG. 3.

The management circuit 11 looks into which priority, high or low, has been selected and given to that event. In a case where the high priority has been given, the management circuit 11 has the playing member 16 pause to stop the play, and has the browsing control member 42 manage to open or download the accessed piece of web contents to play sounds or pictures included therein according to a feature of that website.

The management circuit 11 may allow the browsing control member 42 to play and check a piece of web contents downloaded by pressing the third soft key 15e after having the playing member 16 pause to stop the play, and may have the playing member 16 resume the play after the browsing control member 43 finishes playing and checking In a case where the low priority has been selected and given, the management circuit 11 has the playing member 16 continue the play, and does not have the browsing control member 42 play sounds or pictures of web contents. For example, the management circuit 11 may forbid the browsing control member 42 to play and check a piece of web contents downloaded by pressing the third soft key 15e while the play is going on, although such playing and checking is allowed in a case where no play is going on.

In the embodiments described above, the management circuit 11 refers to the table shown in FIG. 3 if one of the events included therein occurs. In a case where the priority is given as a parameter to a program of processing each event, the management circuit 11 may identify the priority without referring to the table on each occasion. In such a case, the management circuit 11 does not need to identify whether a play is going on or not if one of the events given the high priority occurs, and always produces an event-associated audio signal whether the play is going or not, as these steps are supposed to be followed every time an event given the high priority occurs.

According to the ninth embodiment described above, whether playing a piece of stored contents precedes playing a piece of web contents or not may be preset according to a user's preference.

The present invention may be applied not only to mobile phones but also to other kinds of apparatuses capable of playing audio contents, e.g. personal computers or personal digital assistant (PDA)s. The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A communication apparatus comprising:
   a vibrator;
   a memory configured to store a content including sound data and image data and to pre-store a plurality of notification sound data, each corresponding to one of a plurality events including a first event associated with a first priority higher than a priority of reproduction of the content and a second event associated with a second priority lower than the priority of reproduction of the content;
   a sound output unit configured to output the sound data stored in the memory;
   a display unit configured to display the image data stored in the memory; and
   a control unit configured to access the memory when an event occurs while outputting the sound data and displaying the image data, to determine which of the plurality of notification sound data pre-stored in the memory corresponds to the event and identify a priority of the event as being the first priority or the second priority by accessing the memory when the event occurs during outputting of the sound data and displaying of the image data, wherein the control unit is configured to
      control, when reception of an incoming call comprising the first event associated with the first priority occurs during outputting the sound data and displaying the image data, the sound output unit to stop outputting the sound data and the display unit to stop displaying the image data, respectively,
      start counting time from the stop of the outputting of the sound data and the displaying of the image data and control the sound output unit to output the pre-stored notification sound data corresponding to the reception of the incoming call,
      control, when the counted time reaches a predetermined period, the sound output unit to resume outputting the sound data and the display unit to resume displaying the image data, respectively, and
   wherein the control unit is further configured to
      keep, when reception of a mail which is the second event associated with the second priority occurs during outputting of the sound data and displaying of the image data, the sound output unit to output the sound data and the display unit to display both the image data and an image relating to the mail reception in an area not used to display the image data, respectively, and
      control the vibrator to vibrate in place of outputting the pre-stored notification sound data via the sound output unit.

2. The communication apparatus of claim 1, wherein the area is same line area displaying a picture indicating a remaining battery power or a radio wave condition.

3. A communication apparatus comprising:
   a vibrator;
   a memory configured to store a content including image data and sound data and to pre-store a plurality of notification sound data, each corresponding to one of a plurality events including a first event associated with a first priority higher than a priority of reproduction of the content and a second event associated with a second priority lower than the priority of reproduction of the content;
   a sound output unit configured to output the sound data stored in the memory;
   a display unit configured to display the image data stored in the memory; and
   a control unit configured to configured to access the memory when an event occurs while outputting the sound data and displaying the image data, to determine which of the plurality of notification sound data pre-stored in the memory corresponds to the event and identify a priority of the event as being the first priority or second priority by accessing the memory when the event occurs during outputting of the sound data and displaying of the image data wherein the control unit is configured to
      control, when a first event or second event is detected by the control unit during outputting the sound data included in the content and displaying the image data, when reception of an incoming call comprising the first event associated with the first priority is detected by the control unit, control the sound output unit and the display unit to stop outputting the sound data and displaying the image data, respectively,
      start counting time from the stop of the outputting of the sound data and the displaying of the image data and control the sound output unit to output the pre-stored notification sound data, in addition to displaying information indicating the reception of the incoming call when a first event is detected, and
      control, when the counted time reaches a predetermined period, the sound output unit to resume outputting the sound data and the display unit to resume displaying the image data, respectively, and
   wherein the control unit is further configured to
      when reception of a mail which is the second event associated with the second priority occurs during outputting of the sound data and displaying of the image data, control the sound output unit and the display unit to keep the sound output unit outputting the sound data and the display unit displaying both the image data and an image relating to the mail reception in an area not used to display the image data, respectively, and
      control the vibrator to vibrate in place of outputting the pre-stored notification sound data via the sound output unit if the second event is detected.

4. A communication apparatus comprising:
   a vibrator;
   a memory configured to store a content including image data and sound data and to pre-store a plurality of notification sound data, each corresponding to one of a plurality events including a first event associated with a first priority higher than a priority of reproduction of the content and a second event associated with a second priority lower than the priority of reproduction of the content;
   a sound output unit configured to output the sound data stored in the memory;
   a display unit configured to display the image data stored in the memory; and
   a control unit configured to configured to access the memory when an event occurs while outputting the sound data and displaying the image data, to determine which of the plurality of notification sound data pre-stored in the memory corresponds to the event and identify a priority of the event as being the first priority or second priority by accessing the memory when the event occurs during outputting of the sound data and displaying of the image data, wherein the control unit is configured to when a first event or second event is detected by the control unit during outputting the sound data included in the content and displaying the image data, the first event comprising a reception of an incoming call, and the second event comprising a reception of a mail, control the sound output unit and the display unit to stop outputting the sound data and displaying the image data, respectively, start counting time from the stop of the outputting of the sound data and the displaying of the image data and control the sound output unit to output the pre-stored notification sound data, in addition to displaying information indicating the reception of the incoming call when a first event is detected, and control, when the counted time reaches a predetermined period, the sound output unit to resume outputting the sound data and the display unit to resume displaying the image data, respectively, and wherein the control unit is further configured to
control the vibrator to vibrate in place of outputting the pre-stored notification sound data via the sound output unit if the second event is detected.

5. The communication apparatus of claim 1, wherein the sound output unit is controlled to output the pre-stored notification sound data for a predetermined time period.

6. The communication apparatus of claim 3, wherein the control unit is further configured, in addition to control the sound output unit to output the notification sound data and to control the display unit to display information indicating the event, to control the vibrator to vibrate, if the detected event has a higher priority than reproduction of content.

7. The communication apparatus of claim 4, wherein the control unit is further configured, in addition to control the sound output unit to output the notification sound data and to control the display unit to display information indicating the event, to control the vibrator to vibrate, if the detected event has a higher priority than reproduction of content.

* * * * *